(No Model.)

C. H. PAGETT.
PNEUMATIC TIRE.

No. 499,574. Patented June 13, 1893.

WITNESSES:
F. L. Ourand
J. L. Leoomb

INVENTOR:
Charles H. Pagett
by Munn Dagger & Co.
Attorneys

UNITED STATES PATENT OFFICE.

CHARLES H. PAGETT, OF OXFORD, INDIANA.

PNEUMATIC TIRE.

SPECIFICATION forming part of Letters Patent No. 499,574, dated June 13, 1893.

Application filed November 7, 1892. Serial No. 451,280. (No model.)

*To all whom it may concern:*

Be it known that I, CHARLES H. PAGETT, a citizen of the United States, and resident of Oxford, in the county of Benton and State of Indiana, have invented certain new and useful Improvements in Pneumatic Tires for Bicycles; and I do hereby declare that the following is a full, clear, and exact description of the invention, which will enable others skilled in the art to which it appertains to make and use the same, reference being had to the accompanying drawings, which form a part of this specification.

My invention relates to improvements in pneumatic rubber tires for bicycles, velocipedes and other similar objects.

Pneumatic tires for bicycle and other wheels generally consist of a hollow rubber tube extending around the periphery of the wheels and secured to the fellies thereof. In practice it frequently happens that the tire is cut by pieces of glass or sharp stones, allowing the air to escape and rendering the wheel inefficient until the accident is remedied.

The object of my invention is to provide a protector for pneumatic tires which will prevent the same from being cut through so as to allow the air to escape, under any usage to which bicycle or velocipede is ordinarily subjected.

The invention consists essentially in a curved strip of braided wire or wire cloth, embedded and molded in the rubber tire between the air chamber and the periphery thereof and extending entirely around the wheel. It also consists in improved means for securing the tire to the felly as hereinafter fully described and claimed.

Figure 1:
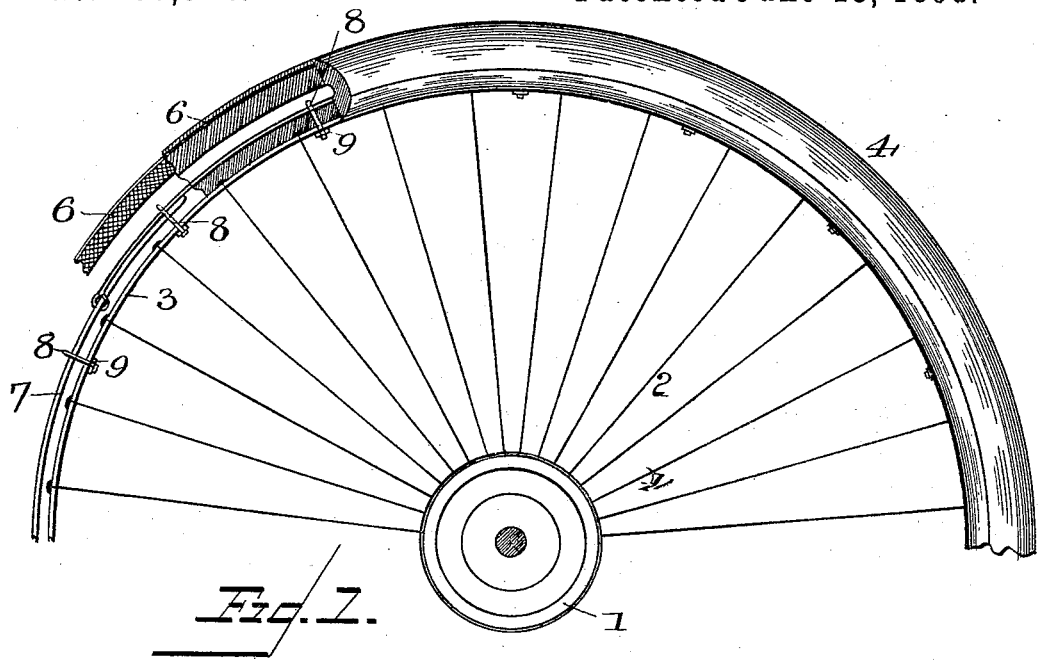
Figure 2:
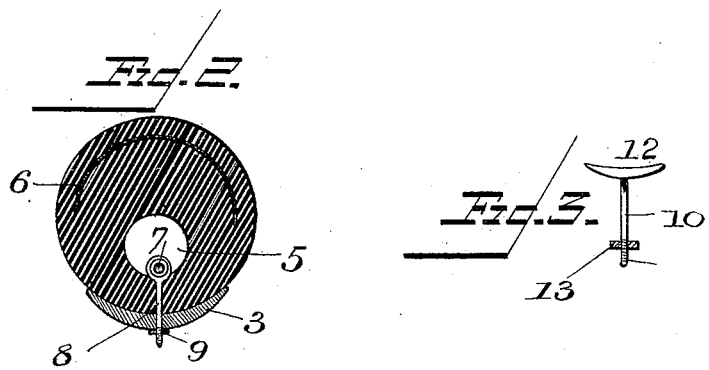
Figure 3:
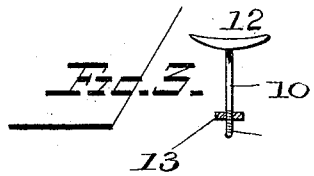

In the accompanying drawings: Figure 1 is a side view of a portion of a bicycle wheel, partly broken away, constructed in accordance with my invention. Fig. 2 is a cross section through the tire. Fig. 3 is a view of a modified construction of fastening device.

In the said drawings the reference numeral 1 denotes the hub, 2 the spokes and 3 the concave felly which may be of any ordinary construction.

The numeral 4 denotes the tire consisting of an endless rubber cylindrical tube, having a continuous air chamber 5 therein. Embedded and molded in the endless tube between the periphery thereof and the air chamber and concentric with and a short distance from the said periphery, is a strip 6 of braided wire or wire cloth, bent so as to conform to the contour of the tire and extending entirely around the wheel. Located in the air chamber is a metal rod or stiff wire 7, the ends of which overlap each other and one end twisted around the body portion. This rod passes through screw threaded eye bolts 8, arranged at suitable intervals apart, which pass through the tire and through apertures in the felly and are secured to the felly by means of nuts 9, by which the tire is securely held in place.

From the above it will be seen that there is no liability of the tire being cut through to the air chamber by coming in contact with pieces of broken glass or sharp stones by reason of the protector 6.

Instead of employing the fastening device above described, I may use the means shown in Fig. 3, which comprises a short rod 10, having a head or button 12 at one end and screw threaded at the opposite end to receive a nut 13. This rod passes through the tire and felly and is secured in place by the nut.

While my invention is more especially designed for use in connection with pneumatic tires, yet it is obvious that the improved means for fastening the tire to the felly may be employed in the ordinary cushion or solid tires.

Having thus described my invention, what I claim is—

In a velocipede or other wheel, the combination with the felly having a series of apertures therein, of the endless rubber tube having a continuous air chamber, the concavo-convex protector of braided wire or wire cloth embedded in said tube between the air chamber and the periphery, the wire rod having an eye formed at one end through which the other end passes so that said ends overlap each other, the screw threaded eye bolts through which said rod passes, which pass through the tire and the apertures in the felly and the securing nuts, substantially as described.

In testimony that I claim the foregoing as my own I have hereunto affixed my signature in presence of two witnesses.

CHARLES H. PAGETT.

Witnesses:
J. G. CARNAHAN,
JOHN A. KOCH.